(12) United States Patent
Makineedi et al.

(10) Patent No.: US 11,281,513 B2
(45) Date of Patent: Mar. 22, 2022

(54) MANAGING HEAP METADATA CORRUPTION

(71) Applicant: International Business Machines Corporation, Armonk, NY (US)

(72) Inventors: Sreenivas Makineedi, Round Rock, TX (US); Srinivasa Rao Muppala, Round Rock, TX (US); Rama Mothey Tenjarla, Austin, TX (US); Vidya Makineedi, Round Rock, TX (US); Douglas Griffith, Burnet, TX (US)

(73) Assignee: International Business Machines Corporation, Armonk, NY (US)

( * ) Notice: Subject to any disclaimer, the term of this patent is extended or adjusted under 35 U.S.C. 154(b) by 537 days.

(21) Appl. No.: 16/434,249

(22) Filed: Jun. 7, 2019

(65) Prior Publication Data

US 2020/0387416 A1 Dec. 10, 2020

(51) Int. Cl.
*G06F 11/00* (2006.01)
*G06F 11/07* (2006.01)
*G06F 9/50* (2006.01)
*G06F 12/02* (2006.01)
*G06F 11/30* (2006.01)
*G06F 11/14* (2006.01)

(52) U.S. Cl.
CPC .......... *G06F 11/073* (2013.01); *G06F 9/5016* (2013.01); *G06F 11/0793* (2013.01);
(Continued)

(58) Field of Classification Search
CPC ............... G06F 11/073; G06F 11/0751; G06F 11/0793; G06F 11/08; G06F 11/1016; G06F 11/1024; G06F 11/1048; G06F 11/1064; G06F 11/1068; G06F 11/1072; G06F 11/14; G06F 11/141; G06F 11/142; G06F 11/1435; G06F 11/1471; G06F 11/1474; G06F 11/16; G06F 11/1612;
(Continued)

(56) References Cited

U.S. PATENT DOCUMENTS 5,949,972 A * 9/1999 Applegate ........... G06F 11/3644
714/54
7,827,375 B2 11/2010 Abrashkevich et al.
(Continued)

OTHER PUBLICATIONS

Heelan, Sean, Tom Melham, and Daniel Kroening. "Automatic heap layout manipulation for exploitation." In 27th {USENIX} Security Symposium ({USENIX} Security 18), pp. 763-779. 2018. (Year: 2018).*

(Continued)

*Primary Examiner* — Anthony J Amoroso
(74) *Attorney, Agent, or Firm* — Donald J. O'Brien (57) ABSTRACT

Embodiments are disclosed for managing heap metadata corruption. The techniques include detecting a metadata corruption error in a first heap disposed in a first region of memory. The techniques also include generating a second heap in a free memory region that is disposed beyond a break value address of a memory allocation system. The techniques further include updating a first entry for the first heap in a heap directory. Additionally, the techniques include generating a second entry for the second heap in the heap directory. The techniques also include processing a call to the memory allocation system for the first heap based on the first entry and the second entry.

20 Claims, 5 Drawing Sheets

(52) U.S. Cl.
CPC ........ *G06F 11/142* (2013.01); *G06F 11/1479* (2013.01); *G06F 11/3086* (2013.01); *G06F 12/023* (2013.01)

(58) Field of Classification Search
CPC ............... G06F 11/202; G06F 11/2043; G06F 11/2046; G06F 11/2048; G06F 11/2051; G06F 11/2053; G06F 11/3065; G06F 11/3086; G06F 9/5016; G06F 9/5005; G06F 9/5011; G06F 12/023; G06F 12/02; G06F 12/0223; G06F 12/0284; G06F 12/0292
See application file for complete search history.

(56) References Cited

U.S. PATENT DOCUMENTS

| | | | |
|---|---|---|---|
| 9,880,761 B2 | 1/2018 | Hack et al. | |
| 9,990,492 B2* | 6/2018 | Melski | G06F 12/023 |
| 10,095,573 B2 | 10/2018 | Stark et al. | |
| 10,331,888 B1* | 6/2019 | Gupta | G06F 11/0751 |
| 10,990,667 B2* | 4/2021 | Melski | G06F 12/023 |
| 2002/0055941 A1* | 5/2002 | Kolodner | G06F 3/0688 |
| 2005/0108516 A1 | 5/2005 | Balzer et al. | |
| 2012/0222116 A1 | 8/2012 | Chenette | |
| 2014/0020112 A1 | 1/2014 | Goodes | |
| 2017/0185536 A1 | 6/2017 | Li et al. | |

OTHER PUBLICATIONS

S. Zonouz, et al., "Dynamic Memory Protection via Intel SGX-Supported Heap Allocation," 2018 IEEE 16th Intl Conf on Dependable, Autonomic & Secure Computing, 16th Intl Conf on Pervasive Intellig. & Comp., 4th Intl Conf on Big Data Intellig. & Comp., and Cyber Sci. & Tech. Cong., 2018, pp. 608-617 (Year: 2018).*

* cited by examiner

FIG. 1

| ADDRESS 202 | CONTENT BYTE 202-1 |
|---|---|
| ... | ... |
| ADDRESS 204 | CONTENT BYTE 204-1 |
| ... | ... |
| ADDRESS 206 | CONTENT BYTE 206-1 |
| ... | ... |
| ADDRESS 208 | CONTENT BYTE 208-1 |

MANAGING HEAP METADATA CORRUPTION

BACKGROUND

The present disclosure relates to data corruption, and more specifically, to managing data corruption.

Computer applications use computer memory to perform the logical and computational operations written in computer code. More specifically, computer applications use heap memory to hold the actual data upon which these operations are performed. Heap memory is a specific region of memory that computer applications can use to hold the data upon which their operations are performed.

SUMMARY

Embodiments are disclosed for managing heap metadata corruption. The techniques include detecting a metadata corruption error in a first heap disposed in a first region of memory. The techniques also include generating a second heap in a free memory region that is disposed beyond a break value address of a memory allocation system. The techniques further include updating a first entry for the first heap in a heap directory. Additionally, the techniques include generating a second entry for the second heap in the heap directory. The techniques also include processing a call to the memory allocation system for the original heap based on the first entry and the second entry.

Further aspects of the present disclosure are directed toward methods, systems, and computer program products with functionality similar to the functionality discussed above regarding the computer-implemented methods. The present summary is not intended to illustrate each aspect of, every implementation of, and/or every embodiment of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

While the present disclosure is amenable to various modifications and alternative forms, specifics thereof have been shown by way of example in the drawings and will be described in detail. It should be understood, however, that the intention is not to limit the present disclosure to the particular embodiments described. On the contrary, the intention is to cover all modifications, equivalents, and alternatives falling within the spirit and scope of the present disclosure.

DETAILED DESCRIPTION

For various reasons, heap memory can be subject to corruption issues. More specifically, these corruptions issues can occur in the actual data being operated upon by the computer applications, and in the metadata that is used to manage this data. Metadata refers to a set of information that describes another set of information. Computer systems can use metadata to help manage data efficiently.

When a computer application's data becomes corrupted, the computer application can resolve the corruption error itself. In fact, many computer applications have their own validation mechanisms for evaluating data the computer application reads from heap memory. However, computer applications cannot resolve corruption issues in the metadata. As such, if the metadata for data processed by a computer application is corrupted, the computer application can hang and/or crash.

Accordingly, embodiments of the present disclosure can detect heap metadata corruption and resolve the corruption to prevent computer applications from hanging and crashing. For example, upon detecting a metadata corruption issue, a heap metadata corruption manager can create a new heap in a free region of memory. Additionally, further calls to the heap with the corrupted metadata can be either ignored or applied to the new heap. In this way, the heap metadata corruption manager can improve the availability of computer applications that can otherwise hang and crash when their metadata becomes corrupted. These improvements and/or advantages are a non-exhaustive list of example advantages. Embodiments of the present disclosure exist which can contain none, some, or all of the aforementioned advantages and/or improvements.

Figure 1:
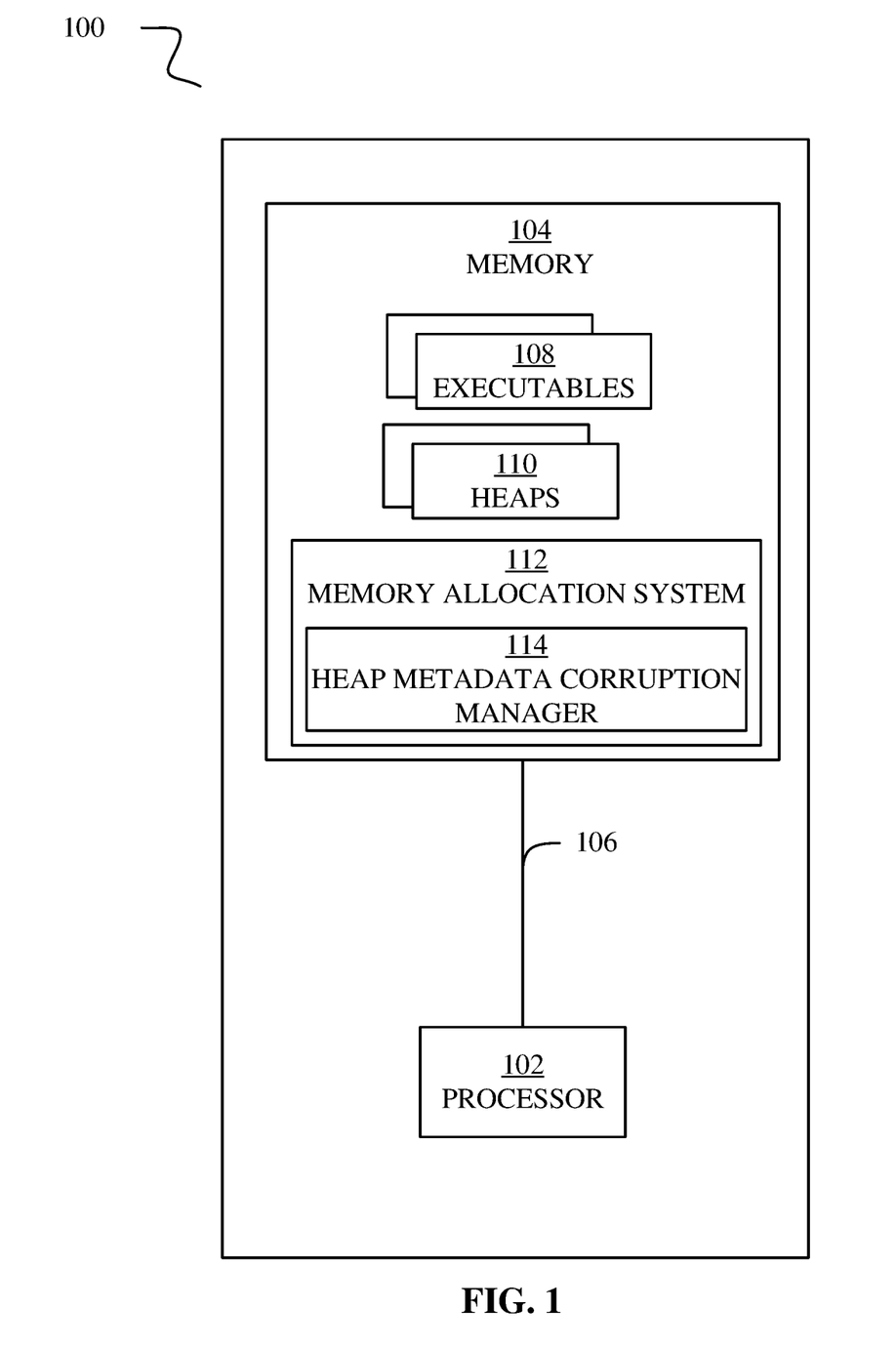
FIG. 1 illustrates a block diagram of a system for managing heap metadata corruption, in accordance with embodiments of the present disclosure.

Referring now to FIG. 1, which is a block diagram of a system 100 for managing heap metadata corruption, in accordance with embodiments of the present disclosure. The system 100 includes a processor 102 and a memory 104 connected over a bus 106. The processor 102 can be a computer processing circuit, such as a central processing unit (CPU). The processor 102 can retrieve and execute programming instructions stored in the memory 104. The bus 106 is used to move data and programming instructions between the processor 102 and the memory 104.

The memory 104 can be a random access memory, such as a static random access memory (SRAM), dynamic random access memory (DRAM), or the like. According to embodiments of the present disclosure, the memory 104 can include executables 108, heaps 110, and a memory allocation system 112. Each of the executables 108 can be a computer application having a set of computer instructions in binary code. Each of the executables 108 can use a relatively large segment of memory for the data upon which the executable 108 operates. The memory allocation system 112 can create and manage the heaps 110 within this segment of memory.

The memory allocation system 112 can manage the heaps through a set of commands that the executables 108 can use to assign memory for the executables' use, and to free memory for use by other executables 108. According to embodiments of the present disclosure, the memory allocation system 112 can include a heap metadata corruption manager 114. When the metadata of a heap 110 is corrupted, the memory allocation system 112 can encounter an error while attempting to allocate or free memory of the corrupted heap 110. Accordingly, the heap metadata corruption manager 114 can detect the error and exit without error from the attempt to allocate or free memory. Further, the heap metadata corruption manager 114 can create a new heap 110 in a free region of memory. Thereafter, in response to attempts by an executable 108 to access the corrupted heap, the heap metadata corruption manager 114 can ignore the attempts or use the new heap 110.

Figure 2:
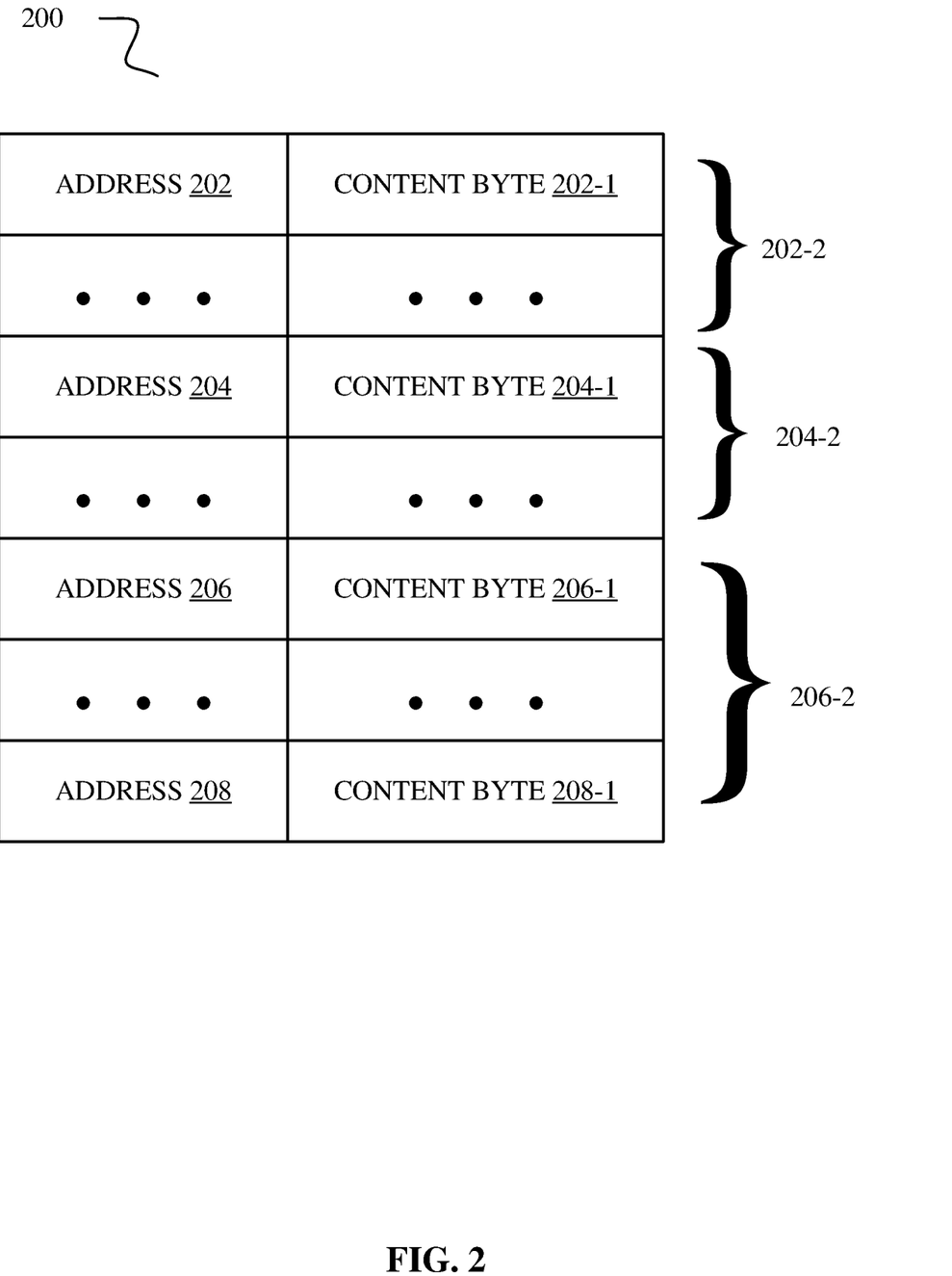
FIG. 2 illustrates a block diagram of a memory map for managing heap metadata corruption, in accordance with embodiments of the present disclosure.

Referring now to FIG. 2, illustrated is a block diagram of a memory map 200 for managing heap metadata corruption, in accordance with embodiments of the present disclosure. The memory map 200 includes addresses 202, 204, 206, and 208 and their respective content bytes 202-1, 204-1, 206-1, and 208-1. A memory, such as the memory 104, includes various types of content, such as the instructions of executables 108 and the data, e.g., the heaps 110, operated upon by the executables. Referring back to FIG. 2, the memory content can be stored in specific portions, e.g., bytes. Accordingly, each byte of memory can be located at a specific memory address. Thus, each address 202, 204, 206, 208 identifies the location of each associated content byte 202-1, 204-1, 206-1, 208-1.

Further, the memory 104 can be organized to include different types of data in different regions. For example, the memory region 202-2 can include all the content bytes from the memory address 202 through the last addressable byte before the memory address 204. According to embodiments of the present disclosure, the memory region 202-2 can include the computer instructions of the executables 108. Thus, each instruction can be included in one or more content bytes in the region 202-2.

Additionally, the memory region 204-2 can include all the content bytes from the memory address 204 through the last addressable byte before the memory address 206. According to embodiments of the present disclosure, the memory region 204-2 can include the data, e.g., heaps 110, being operated upon by the instructions in memory region 202-2. Accordingly, the memory address 204 is also referred to herein as the data start address.

The memory region 206-2 starts at the memory address 206 and ends at the memory address 208. The memory address 206 can represent the break value address. The break value address can represent the end of addressable memory for an executable 108. Thus, the executable 108 may not expressly reference memory at any address from the memory address 206 and beyond. Further, the address 208 can represent the end of addressable memory in the memory 104. Thus, the content byte 208-1 at memory address 208 can be the last readable and writable byte of data in the memory 104. Thus, the region 206-2 can include content bytes 206-1 through 208-1. The region 206-2 can also be referred to as free memory because none of the executables are permitted to directly access the region 206-2.

However, as stated previously, the metadata of the heaps 110 can become corrupted. Accordingly, the heap metadata corruption manager 114 can resolve metadata corruption issues. More specifically, when an executable 108 attempts to free or allocate memory in a corrupted heap, the executable 108 can make a call to the memory allocation system 112. If the heap being referenced has corrupted metadata, the heap metadata corruption manager 114 can detect the corrupted heap. Further, the heap metadata corruption manager 114 can create a new heap for the executable 108 to use. According to embodiments of the present disclosure, the heap metadata corruption manager 114 can create the new heap in the region 206-2. In this way, the heap metadata corruption manager 114 can make it possible for the affected executable 108 to continue running without the errors associated with corrupted heap metadata. Additionally, the heap metadata corruption manager 114 can respond to further calls to free or allocate memory in the corrupted heap by ignoring the call, or applying the operation being called to the new heap 110. In this way, the heap metadata corruption manager 114 can increase the availability of the executables 108 in the case of heap metadata corruption.

The memory allocation system 112 can include a service called sbrk( ), which restricts the data region that is addressable by a computer application. As such, the remaining data region can be used by the application for other purposes like shared memory, memory mapping, and the like. Thus, when a computer application wants to use the memory beyond the memory address 208 for its data, the computer application can extend its addressable memory by using an sbrk( ) call.

Figure 3:
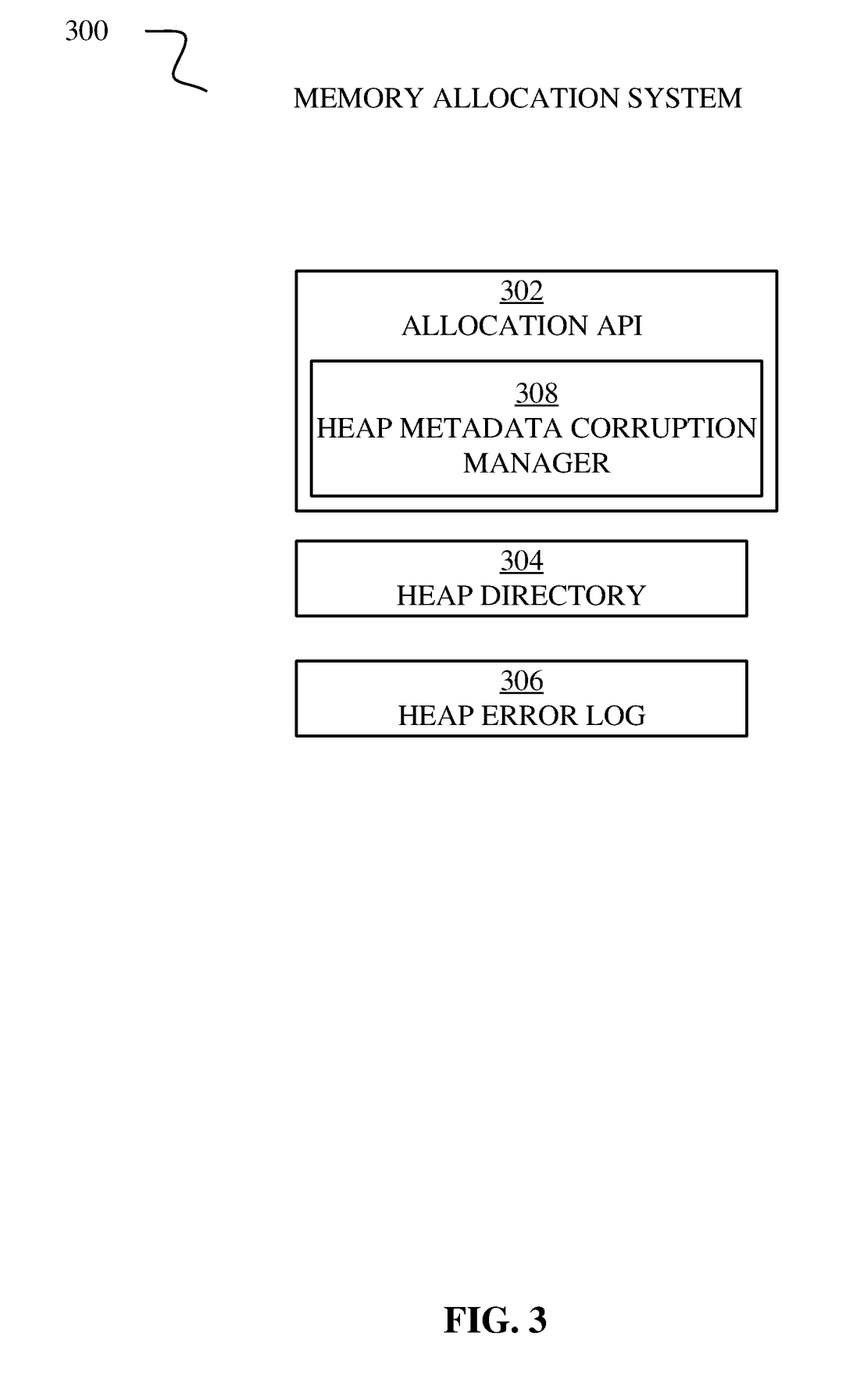
FIG. 3 illustrates a block diagram of an example memory allocation system for managing heap metadata corruption, in accordance with embodiments of the present disclosure.

Referring now to FIG. 3, illustrated is a block diagram of an example memory allocation system 300 for managing heap metadata corruption, in accordance with embodiments of the present disclosure. The example memory allocation system 300 includes an allocation API 302, heap directory 304, and a heap error log 306.

The allocation API 302 can provide an interface for the executables 108 to access heap memory. More specifically, the allocation API 302 can include a set of calls to various commands for accessing heaps 110. The calls can include commands to free heap memory, allocate heap memory, and the like. The heap directory 304 can include a mapping between heaps 110 and their associated memory addresses. Accordingly, when an executable 108 makes a call to the allocation API 302 to access a specific heap 110, the allocation API 302 can look up the memory address for the referenced heap 110 in the heap directory 304. Further, when an executable 108 makes a call to the allocation API 302 to request memory, the allocation API 302 can look up the heap directory 304 for the active heap and provide allocation from that heap.

According to embodiments of the present disclosure, when the executable 108 attempts to allocate from a heap with corrupted metadata, the allocation API 302 can generate an error. Accordingly, the allocation API includes the heap metadata corruption manager 308. The heap metadata corruption manager 308 can register the error in the heap error log 306. Further, the heap metadata corruption manager 308 can generate a new heap in a free memory region, such as the free memory region 206-2. Further, the heap metadata corruption manager 308 can update the heap directory 304 such that the memory address for the corrupted heap is changed to the new heap with the new heap address. Additionally, the heap directory 304 can include a flag indicating whether a specific heap is active. Thus, when the executable attempts to allocate or free memory, the allocation API 302 can act accordingly. If the executable 108 attempts to allocate memory, the allocation API 302 can look up the active heap in the heap directory 304 and then allocate memory from the active heap. There is only one active heap at any given time. However, if the executable 108 attempts to free memory in the corrupted heap, the heap metadata corruption manager 308 can again determine that the heap is inactive and avoid potential errors with the corrupted metadata by taking no action.

Table 1 provides an example of the heap directory 304:

TABLE 1

| HEAP ID | HEAP ADDRESS | HEAP ACTIVE FLAG |
|---------|--------------|------------------|
| 0001 | FF000000 | N |
| 0002 | FF002000 | N |
| 0003 | FF004000 | Y |

Table 1 includes 3 entries for heaps 1 through 3. Heap 1 is located at address FF000000. Further, the Heap Active Flag is set to "N" for Heap 1. As such, Heap 1 is inactive. All calls to the allocation API 302 to free or allocate memory in Heap 1 are performed at address FF000000. Further, Heap 2 has its Heap Active Flag set to "N." As such, Heap 2 can represent a heap with corrupted metadata. Accordingly, calls to the allocation API 302 to free memory from Heap 2 can be ignored. Further, calls to the allocation API 302 to allocate memory to Heap 2 are performed at Heap Address FF002000. As shown, Heap 3 is located at Heap Address FF004000, and has its Heap Active Flag set to "Y." As such, Heap 3 can represent a new heap that the heap metadata corruption manager 308 creates to use in place of Heap 2.

Figure 4:
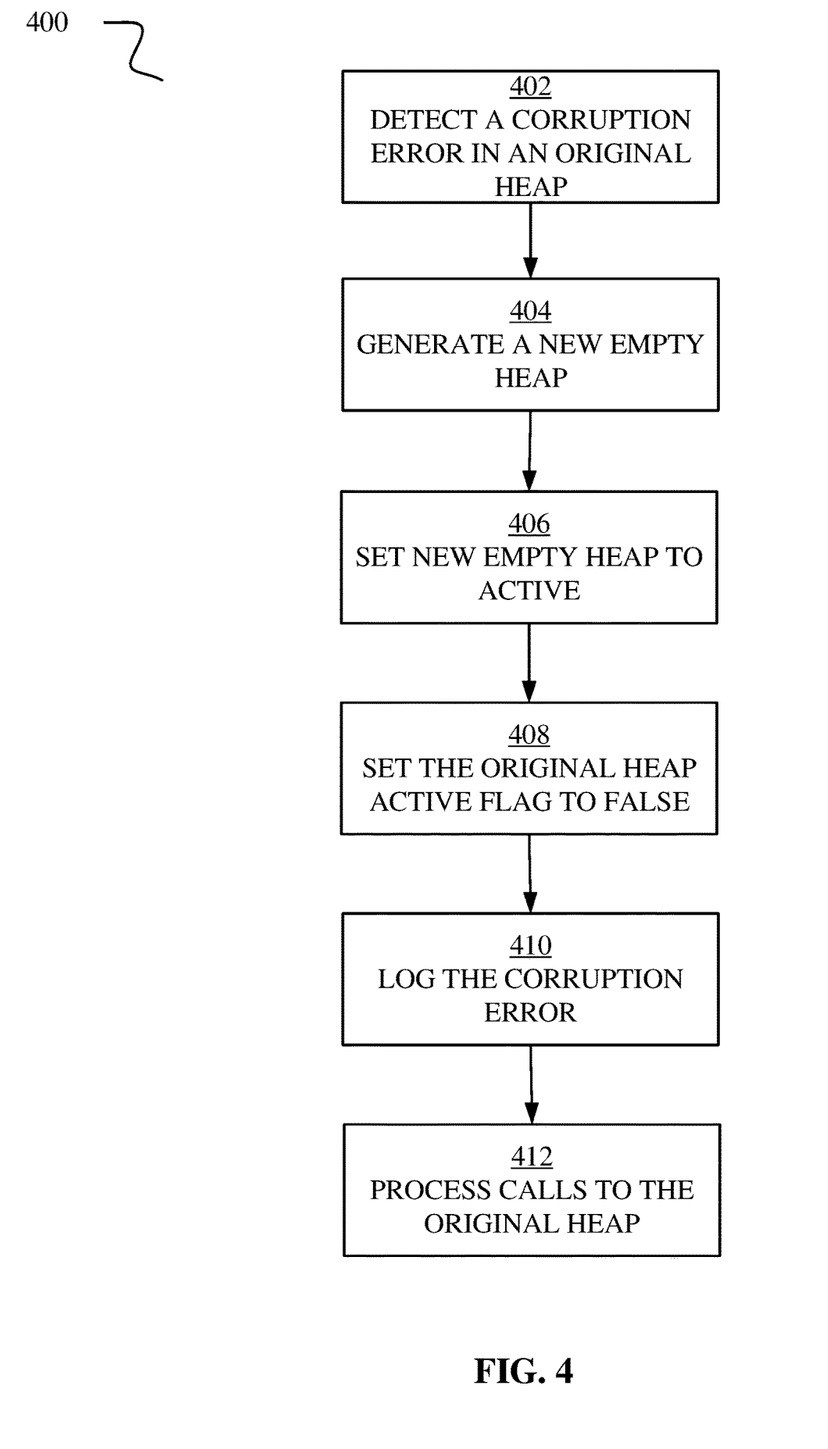
FIG. 4 illustrates a flowchart of an example method for managing heap metadata corruption, in accordance with embodiments of the present disclosure.

Referring now to FIG. 4, illustrated is a flowchart of an example method 400 for managing heap metadata corruption, in accordance with embodiments of the present disclosure. The method 400 can be performed by a heap metadata corruption manager, such as the heap metadata corruption manager 114 described with respect to FIG. 1. Referring back to FIG. 4, at block 402, the heap metadata corruption manager 108 can detect a corruption error in an original heap 110. The corruption error can indicate that the metadata of the heap 110 is corrupted.

At block 404, the heap metadata corruption manager 114 can generate a new, empty heap of the heaps 110. The new, empty heap 110 can be used in place of the corrupted heap in heaps 110.

At block 406, the heap metadata corruption manager 114 can set the new heap 110 to active. According to embodiments of the present disclosure, the heap metadata corruption manager 114 can generate a new entry for the new heap 110 in the heap directory 304. Further, the heap metadata corruption manager 114 can set the active flag in the heap directory 304 to active.

At block 408, the heap metadata corruption manager 114 can set the original heap active flag to false. In other words, the heap metadata corruption manager 114 can update the entry for the original heap 110 in the heap directory 304. More specifically, the heap metadata corruption manager 114 can set the active flag for the original heap 110 to false. The false setting can be similar to an inactive status or the equivalent.

At block 410, the heap metadata corruption manager 114 can log the corruption error. For example, the heap metadata corruption manager 114 can create a new entry in the heap error log 306 indicating that the original heap metadata is corrupted.

At block 412, the allocation API 302 can process calls to the original heap 110. For example, if an executable 108 attempts to allocate memory to the original heap 110, the allocation API 302 can look up the original heap 110 in the heap directory 304. Further, since the active flag of the original heap 110 is set to inactive, the allocation API can determine the memory address of the new heap 110 using the heap directory 304. However, if the executable 108 attempts to free memory from the original heap 110, the allocation may determine that the original heap 110 is inactive using the heap directory 304. Further, once the allocation API 302 determines the original heap 110 is inactive, the allocation API 302 may take no further action. In this way, the heap metadata corruption manager 114 can determine that the call comprises a free operation, and return control to the executable 108 that is performing the call without performing the free operation.

Embodiments of the present disclosure can manage heap metadata corruption issues for various types of heap memory, including multi-heap memory, buckets, and any other heaps that are disposed between the data start address and the break value address. For example, if an executable 108 uses multi-heap memory with eight heaps 110, all eight heaps 110 are disposed between the data start address and the break value address. Thereafter, upon detecting a heap metadata corruption issue with this multi-heap, the heap metadata corruption manager 114 can create another multi-heap within the free memory region starting at the break value address. In this way, the heap metadata corruption manager can ensure there is enough space for the new heap 110. Alternatively, the heap metadata corruption manager 114 can create a single heap 110 to use in place of the multi-heap with the corrupted metadata.

Figure 5:
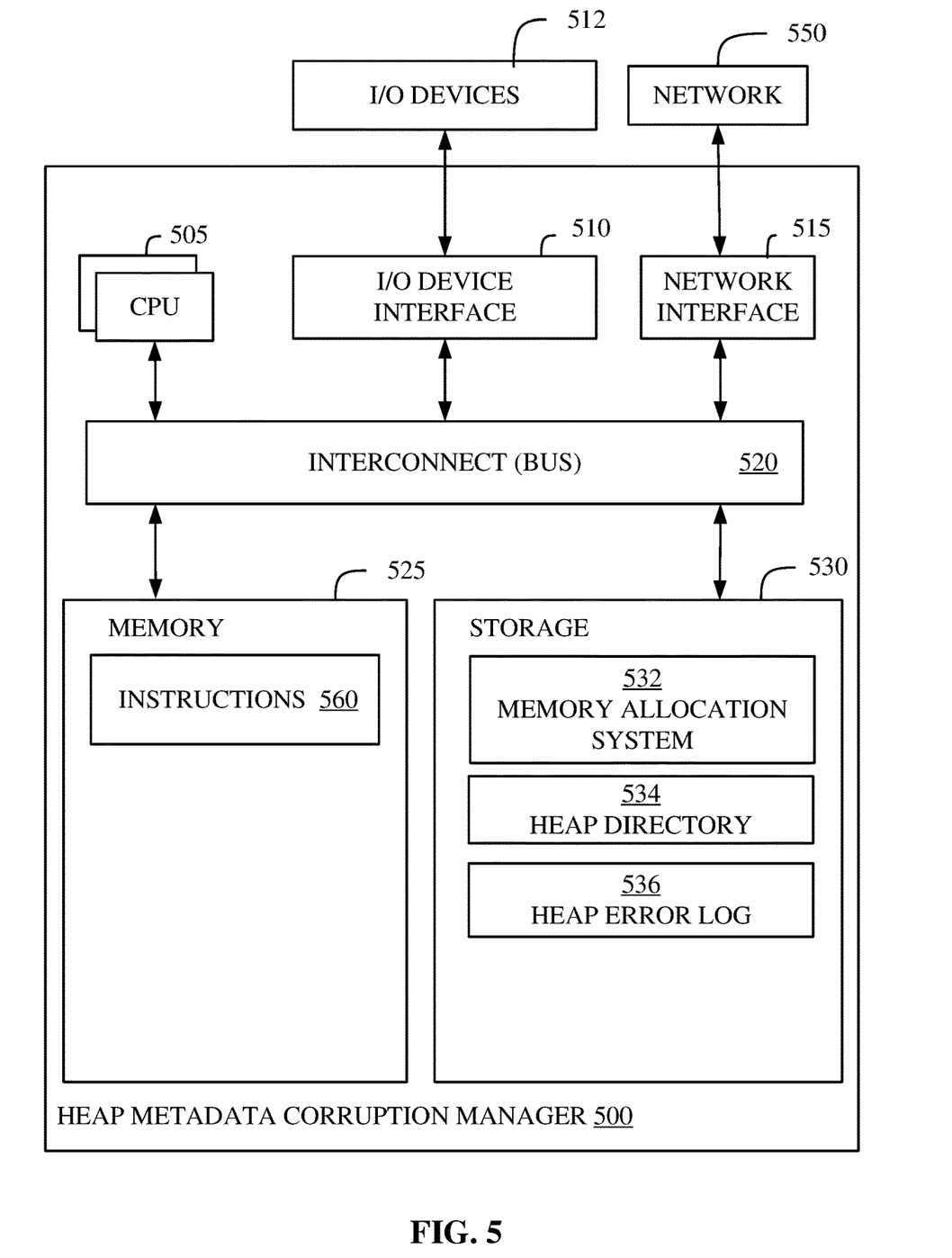
FIG. 5 illustrates a block diagram of an example heap corruption manager, in accordance with embodiments of the present disclosure.

Referring now to FIG. 5, illustrated is a block diagram of an example heap metadata corruption manager 500, in accordance with embodiments of the present disclosure. In various embodiments, the heap metadata corruption manager 500 can perform the method described in FIG. 4 and/or the functionality discussed in FIGS. 1-3. In some embodiments, the heap metadata corruption manager 500 provides instructions for the aforementioned methods and/or functionalities to a client machine such that the client machine executes the method, or a portion of the method, based on the instructions provided by the heap metadata corruption manager 500. In some embodiments, the heap metadata corruption manager 500 comprises software executing on hardware incorporated into a plurality of devices.

The heap metadata corruption manager 500 includes a memory 525, storage 530, an interconnect (e.g., BUS) 520, one or more CPUs 505 (also referred to as processors 505 herein), an I/O device interface 510, I/O devices 512, and a network interface 515.

Each CPU 505 retrieves and executes programming instructions stored in the memory 525 or the storage 530. The interconnect 520 is used to move data, such as programming instructions, between the CPUs 505, I/O device interface 510, storage 530, network interface 515, and memory 525. The interconnect 520 can be implemented using one or more busses. The CPUs 505 can be a single CPU, multiple CPUs, or a single CPU having multiple processing cores in various embodiments. In some embodiments, a CPU 505 can be a digital signal processor (DSP). In some embodiments, CPU 505 includes one or more 3D integrated circuits (3DICs) (e.g., 3D wafer-level packaging (3DWLP), 3D interposer based integration, 3D stacked ICs (3D-SICs), monolithic 3D ICs, 3D heterogeneous integration, 3D system in package (3DSiP), and/or package on package (PoP) CPU configurations). Memory 525 is generally included to be representative of a random access memory (e.g., static random access memory (SRAM), dynamic random access memory (DRAM), or Flash). The storage 530 is generally included to be representative of a non-volatile memory, such as a hard disk drive, solid state device (SSD), removable memory cards, optical storage, and/or flash memory devices. Additionally, the storage 530 can include storage area-network (SAN) devices, the cloud, or other devices connected to the heap metadata corruption manager 500 via the I/O device interface 510 or a network 550 via the network interface 515.

In some embodiments, the memory 525 stores instructions 560 and the storage 530 stores a memory allocation system 532, heap directory 534, and heap error log 536. However, in various embodiments, the instructions 560, memory allocation system 532, heap directory 534, and heap error log 536 are stored partially in memory 525 and partially in storage 530, or they are stored entirely in memory 525 or entirely in storage 530, or they are accessed over a network 550 via the network interface 515.

The memory allocation system 532 can be a system invoked by an operating system for managing heap memory. More specifically, the memory allocation system 532 can create and manage the heaps 110 within data segment of memory for a computer application. Additionally, the memory allocation system 532 can manage the heaps through a set of commands that the executables 108 can use to assign memory for the executables' use, and to free memory for use by other executables 108. The heap directory 534 can be provided a mapping between specific heaps 110 and their memory addresses. Further, the heap directory 534 can include an active flag indicating whether heaps are active or corrupted. As stated previously, when the metadata of a heap 110 becomes corrupted, the heap metadata corruption manager 500 can generate a new empty heap 110, set the active flag of the old heap to "N," and replace the memory address of the old heap 110 with the memory address for the new heap 110. The labels used are examples only and alternatives such as 0 and 1, or others, could be used. Further, the heap metadata corruption manager 500 can create a new entry for the new heap with the new memory address and the active flag set to "Y." Additionally, the heap metadata corruption manager 500 can generate an entry in the heap error log 536 whenever the metadata of a heap 110 becomes corrupted.

Instructions 560 can be processor-executable instructions for performing any portion of, or all, any of the method of FIG. 4 and/or any of the functionality discussed in FIGS. 1-3. More specifically, the instructions 560 can perform the techniques described herein as performed by the heap metadata corruption manager 114, the heap metadata corruption manager 308, and the heap metadata corruption manager 500.

In various embodiments, the I/O devices 512 include an interface capable of presenting information and receiving input. For example, I/O devices 512 can present information to a user interacting with heap metadata corruption manager 500 and receive input from the user.

The heap metadata corruption manager 500 is connected to the network 550 via the network interface 515. Network 550 can comprise a physical, wireless, cellular, or different network.

In some embodiments, the heap metadata corruption manager 500 can be a multi-user mainframe computer system, a single-user system, or a server computer or similar device that has little or no direct user interface but receives requests from other computer systems (clients). Further, in some embodiments, the heap metadata corruption manager 500 can be implemented as a desktop computer, portable computer, laptop or notebook computer, tablet computer, pocket computer, telephone, smart phone, network switches or routers, or any other appropriate type of electronic device.

It is noted that FIG. 5 is intended to depict the representative major components of an exemplary heap metadata corruption manager 500. In some embodiments, however, individual components can have greater or lesser complexity than as represented in FIG. 5, components other than or in addition to those shown in FIG. 5 can be present, and the number, type, and configuration of such components can vary.

As discussed in more detail herein, it is contemplated that some or all the operations of some of the embodiments of methods described herein can be performed in alternative orders or may not be performed at all; furthermore, multiple operations can occur at the same time or as an internal part of a larger process.

The present disclosure can be a system, a method, and/or a computer program product. The computer program product can include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure can be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams can represent a module, segment, or portion of instructions, which comprises one or more executable instructions for implementing the specified logical function(s). In some alternative implementations, the functions noted in the block can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of example embodiments of the various embodiments, reference was made to the accompanying drawings (where like numbers represent like elements), which form a part hereof, and in which is shown by way of illustration specific example embodiments in which the various embodiments can be practiced. These embodiments were described in sufficient detail to enable those skilled in the art to practice the embodiments, but other embodiments can be used and logical, mechanical, electrical, and other changes can be made without departing from the scope of the various embodiments. In the previous description, numerous specific details were set forth to provide a thorough understanding the various embodiments. But, the various embodiments can be practiced without these specific details. In other instances, well-known circuits, structures, and techniques have not been shown in detail in order not to obscure embodiments.

Different instances of the word "embodiment" as used within this specification do not necessarily refer to the same embodiment, but they can. Any data and data structures illustrated or described herein are examples only, and in other embodiments, different amounts of data, types of data, fields, numbers and types of fields, field names, numbers and types of rows, records, entries, or organizations of data can be used. In addition, any data can be combined with logic, so that a separate data structure may not be necessary. The previous detailed description is, therefore, not to be taken in a limiting sense.

The descriptions of the various embodiments of the present disclosure have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure.

What is claimed is:

1. A computer-implemented method comprising:
    detecting a metadata corruption error in a first heap disposed in a first region of memory;
    generating a second heap in a free memory region that is disposed beyond a break value address of a memory allocation system;
    updating a first entry for the first heap in a heap directory;
    generating a second entry for the second heap in the heap directory; and
    processing a call to the memory allocation system for the first heap based on the first entry and the second entry.

2. The method of claim 1, further comprising generating an entry in an error log for the memory allocation system.

3. The method of claim 1, wherein the first region of memory comprises memory disposed between a data start address and a last addressable memory location before the break value address.

4. The method of claim 1, further comprising detecting the metadata corruption error in response to an execution of an operation of the memory allocation system.

5. The method of claim 1, wherein updating the first entry for the first heap in the heap directory comprises setting an active flag for the first heap to inactive.

6. The method of claim 5, wherein updating the first entry for the first heap in the heap directory comprises associating the first heap with a memory address for the second heap.

7. The method of claim 1, wherein processing the call to the memory allocation system for the first heap comprises:
    determining that the call comprises an allocation operation; and
    upon determining the call is the allocation operation:
        looking up a memory address for the second heap in the first entry for the first heap in the heap directory; and
        allocating an allocatable memory address in the second heap.

8. The method of claim 1, wherein processing the call to the memory allocation system for the first heap comprises:
    determining that the call comprises a free operation; and
    returning control to a computer application that is performing the call without performing the free operation.

9. A computer program product comprising program instructions stored on a computer readable storage medium, wherein the computer readable storage medium is not a transitory signal per se, the program instructions executable by a processor to cause the processor to perform a method comprising:
    detecting a metadata corruption error in a first heap disposed in a first region of memory;
    generating a second heap in a free memory region that is disposed beyond a break value address of a memory allocation system;
    updating a first entry for the first heap in a heap directory;
    generating a second entry for the second heap in the heap directory; and
    processing a call to the memory allocation system for the first heap based on the first entry and the second entry.

10. The computer program product of claim 9, further comprising generating an entry in an error log for the memory allocation system.

11. The computer program product of claim 9, wherein the first region of memory comprises memory disposed between a data start address and a last addressable memory location before the break value address.

12. The computer program product of claim 9, further comprising detecting the metadata corruption error in response to an execution of an operation of the memory allocation system.

13. The computer program product of claim 9, wherein updating the first entry for the first heap in the heap directory comprises setting an active flag for the first heap to inactive.

14. The computer program product of claim 13, wherein updating the first entry for the first heap in the heap directory comprises associating the first heap with a memory address for the second heap.

15. The computer program product of claim 9, wherein processing the call to the memory allocation system for the first heap comprises:
    determining that the call comprises an allocation operation; and
    upon determining the call is the allocation operation:
        looking up a memory address for the second heap in the first entry for the first heap in the heap directory; and
        allocating an allocatable memory address in the second heap.

16. The computer program product of claim 9, wherein processing the call to the memory allocation system for the first heap comprises:
    determining that the call comprises a free operation; and
    returning control to a computer application that is performing the call without performing the free operation.

17. A system comprising:
    a computer processing circuit; and
    a computer-readable storage medium storing instructions, which, when executed by the computer processing circuit, are configured to cause the computer processing circuit to perform a method comprising:
        detecting a metadata corruption error in a first heap disposed in a first region of memory;
        generating a second heap in a free memory region that is disposed beyond a break value address of a memory allocation system;
        updating a first entry for the first heap in a heap directory;
        generating a second entry for the second heap in the heap directory; and
        processing a call to the memory allocation system for the first heap based on the first entry and the second entry.

18. The system of claim 17, further comprising generating an entry in an error log for the memory allocation system.

19. The system of claim 17, wherein the first region of memory comprises memory disposed between a data start address and a last addressable memory location before the break value address.

20. The system of claim 17, wherein processing the call to the memory allocation system for the first heap comprises:
    determining that the call comprises an allocation operation; and
    upon determining the call is the allocation operation:
        looking up a memory address for the second heap in the first entry for the first heap in the heap directory; and
        allocating an allocatable memory address in the second heap.

* * * * *